US011996025B2

(12) United States Patent
Li

(10) Patent No.: US 11,996,025 B2
(45) Date of Patent: May 28, 2024

(54) GATE DRIVER ON ARRAY CIRCUIT AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Guangyao Li, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/753,309

(22) PCT Filed: Feb. 18, 2022

(86) PCT No.: PCT/CN2022/076770
§ 371 (c)(1),
(2) Date: Feb. 27, 2022

(87) PCT Pub. No.: WO2023/142187
PCT Pub. Date: Aug. 3, 2023

(65) Prior Publication Data
US 2024/0038117 A1 Feb. 1, 2024

(30) Foreign Application Priority Data
Jan. 28, 2022 (CN) ......................... 202210108756.2

(51) Int. Cl.
*G09G 3/20* (2006.01)

(52) U.S. Cl.
CPC ....... *G09G 3/20* (2013.01); *G09G 2300/0408* (2013.01); *G09G 2310/0267* (2013.01)

(58) Field of Classification Search
CPC ............... G09G 2300/0408; G09G 2310/0267
See application file for complete search history.

(56) References Cited

U.S. PATENT DOCUMENTS

2015/0077407 A1* 3/2015 Kim .................... G09G 3/3611 345/204

FOREIGN PATENT DOCUMENTS

CN 103714792 A 4/2014
CN 104575420 A 4/2015
(Continued)

OTHER PUBLICATIONS

International Search Report in International application No. PCT/CN2022/076770, dated Sep. 29, 2022.
(Continued)

*Primary Examiner* — Yaron Cohen
(74) *Attorney, Agent, or Firm* — PV IP PC; Wei Te Chung; Zhigang Ma

(57) ABSTRACT

A GOA circuit and a display panel are proposed. An inverting control module controls the voltage level of the first node to be opposite to the voltage level of the second node under the control of an (n+1)th-stage clock signal, so that a DC path between a constant high voltage terminal and a first constant low voltage terminal is not formed. When a first node is at the low voltage level, the voltage applied on the second node transitions from the low voltage level to high voltage level. Accordingly, the second node is constantly at the high voltage level at the pull-down maintenance stage in the GOA circuit, and the nth-stage gate-driven signal terminal is still at the low voltage level. In this way, the GOA circuit will not become ineffective.

18 Claims, 4 Drawing Sheets

(56) References Cited

FOREIGN PATENT DOCUMENTS

| | | | |
|---|---|---|---|
| CN | 106128379 | A | 11/2016 |
| CN | 106128409 | A | 11/2016 |
| CN | 106683631 | A | 5/2017 |
| CN | 108962171 | A | 12/2018 |
| CN | 109448624 | A | 3/2019 |
| CN | 112071250 | A | 12/2020 |

OTHER PUBLICATIONS

Written Opinion of the International Search Authority in International application No. PCT/CN2022/076770, dated Sep. 29, 2022.

* cited by examiner

GATE DRIVER ON ARRAY CIRCUIT AND DISPLAY PANEL

FIELD OF THE DISCLOSURE

The present disclosure relates to display technology, and more particularly, to a gate driver on array (GOA) circuit and a display panel.

BACKGROUND

A gate driver on array (GOA) techniques is directed to an array substrate that integrates a gate driver circuit on a display panel to implement row-by-row scanning so as to save the gate driver circuit area. It has the advantages of lowering production costs and facilitates the design of a narrow bezel of the display panel so the GOA is applied for a variety of displays. A GOA circuit of the related art includes a plurality of cascaded GOA units, and each of the plurality of cascaded GOA units corresponds and drives a first-stage horizontal scanning line. Each of the plurality of cascaded GOA units primarily includes a pull-up circuit, a pull-up control circuit, a pull-down circuit, and a pull-down maintenance circuit. The pull-up circuit is primarily charge of outputting a clock signal to be as a gate-driven signal. The pull-up control circuit controls the opening time of the pull-up circuit by promoting a pull-up node. The pull-up control circuit generally connects a gate-driven signal passed by a previous-stage gate-driven unit. The pull-down circuit is charge of pulling the voltage level of the pull-up node and the gate-driven signal to be low for the first time. The pull-down maintenance circuit maintains the potential of the low voltage level applied on the pull-down node by the voltage level of the pull-up node and the voltage level of the gate-driven signal. The voltage level of the pull-up node and the voltage level of pull-down nodes keep opposite via an inverter generally. In other words, when the pull-up node is at a high voltage level, the pull-down node is at a low voltage level; when the pull-up node is at a low voltage level, the pull-down node is at a high voltage level.

The GOA circuit of the related art may adopt an inverting circuit as shown in FIG. 1, that is, a Darlington inverter. The Darlington inverter includes transistors T110, T120, T130, and T140. The Darlington inverter is configured to make the voltage level of a pull-up node A and the voltage level of a pull-down node B opposite. However, the transistor T110 in such an inverter is always turned on, resulting in the susceptibility of the transistor T110 due to the long-term pressure. Besides, when the voltage level of the pull-up node A is high, a direct current (DC) channel between a constant high voltage terminal VGH and a constant low voltage terminal VGL may cause the inverter to be burnt out easily. Therefore, the inverting circuit as shown in FIG. 1 may be improved to the inverting circuit as shown in FIG. 2. That is, the gate of the transistor T110 and the source of the transistor T110 in FIG. 1 connected to the constant high voltage terminal VGH are replaced with a clock signal CK. Although the clock signal CK is a pulse signal, it may avoid the transistor T110, which is normally turned on, to become useless and ineffective due to the long-term pressure. On the other hand, the clock signal CK is at a low voltage level when the pull-up node A is at a high voltage level, so that the transistor T110 is not easily affected due to the problems of the pressure and the DC channel. However, because the voltage level of the pull-down node B needs to be high to hold the pull-down maintenance circuit pulling down, the transistors T110 and T130 are not completely turned off yet during the process of pulling the voltage level of the clock signal CK from high to low. The pull-down node B is lowered by the constant low voltage terminal VGL so that the pull-down maintenance circuit do not have the pulling-down function, which causes the voltage level of the previous stage gate-driven signal to fail to keep low and the GOA circuit to become useless and ineffective according to the cascading characteristics of the GOA circuit.

Therefore, there are some problems for the two inverting circuits of the related art. In other words, the performance of the GOA circuit of the related art is not stable enough and easy to be invalid.

SUMMARY

Technical Solution

An embodiment of the present disclosure is directed to a gate driver on array (GOA) circuit. The GOA circuit includes a plurality of cascaded GOA units. Each of the plurality of cascaded GOA units includes a pull-up control module, a pull-up module, an inverting control module, a first pull-down module, a second pull-down module, and a pull-down maintenance module.

The pull-up control module is connected to an (n−4)th-stage transmission signal terminal and a first node. The pull-up control module is configured to raise the voltage level of the first node under the control of the (n−4)th-stage transmission signal terminal.

The pull-up module is connected to an nth-stage clock signal terminal, the first node, an nth-stage transmission signal terminal, and an nth-stage gate-driven signal terminal. The pull-up module is configured to control the output of the nth-stage transmission signal terminal and the nth-stage gate-driven signal terminal through the nth-stage clock signal terminal under the control of the first node.

The inverting control module is connected to the first node, a second node, an (n+1)th-stage clock signal terminal, a constant high voltage terminal, and a first constant low voltage terminal. The inverting control module is configured to control the voltage level of the second node to be opposite to the voltage level of the first node through the constant high voltage terminal and the first constant low voltage terminal under the control of the first node and the (n+1)th-stage clock signal terminal.

The first pull-down module is connected to an (n+4)th-stage transmission signal terminal, the first node, and the first constant low voltage terminal. The first pull-down module is configured to lower the voltage level of the first node through the first constant low voltage terminal under the control of the (n+4)th-stage transmission signal terminal.

The second pull-down module is connected to the (n+4)th-stage transmission signal terminal, a second constant low voltage terminal, the nth-stage gate-driven signal terminal, and the second constant low voltage terminal. The second pull-down module is configured to lower the voltage level of the nth-stage transmission signal terminal and the voltage level of the nth-stage gate-driven signal terminal through the second constant low voltage terminal under the control of the (n+4)th-stage transmission signal terminal.

The pull-down maintenance module is connected to the second node QB, the nth-stage transmission signal terminal, the nth-stage gate-driven signal terminal, and the second constant low voltage terminal. The pull-down maintenance module is configured to lower the voltage level of the nth-stage transmission signal terminal and the voltage level of the nth-stage gate-driven signal terminal through the second constant low voltage terminal by imposing a voltage on the second node.

In some embodiments of the present disclosure, the inverting control module comprises a first transistor, a second transistor, a third transistor, a fourth transistor, and a first capacitor. A gate of the first transistor is connected to the (n+1)th-stage clock signal terminal. A source of the first transistor and a source of the third transistor are both connected to the constant high voltage terminal. A gate of the second transistor and a gate of the fourth transistor are both connected to the first nod. A drain of the first transistor, a drain of the second transistor, and a gate of the third transistor are all connected to a first terminal of the first capacitor. A drain of the third transistor and a drain of the fourth transistor are both connected to a second terminal of the first capacitor. A source of the second transistor and a source of the fourth transistor are both connected to the first constant low voltage terminal.

In some embodiments of the present disclosure, the pull-up control module comprises a fifth transistor. A gate of the fifth transistor and a source of the fifth transistor are both connected to the (n−4)th-stage transmission terminal. A drain of the fifth transistor is connected to the first node.

In some embodiments of the present disclosure, the pull-up module comprises a sixth transistor and a seventh transistor. The sixth transistor includes a gate connected to the first node, a source connected to the nth-stage clock signal terminal, and a drain connected to the nth-stage transmission terminal. The seventh transistor includes a gate connected to the first node, a source connected to the nth-stage clock signal terminal, and a drain connected to the nth-stage gate-driven signal terminal.

In some embodiments of the present disclosure, the first pull-down module comprises an eighth transistor that includes a gate connected to the (n+4)th-stage transmission terminal, a source connected to the first constant low voltage terminal, and a drain connected to the first node.

In some embodiments of the present disclosure, the second pull-down module comprises a ninth transistor and a tenth transistor. The ninth transistor includes a gate connected to the (n+4)th-stage transmission terminal, a source connected to the second constant low voltage terminal, a drain connected to the nth-stage transmission terminal. The tenth transistor includes a gate connected to the (n+4)th-stage transmission terminal, a source connected to the second constant low voltage terminal, and a drain connected to the nth-stage gate-driven signal terminal.

In some embodiments of the present disclosure, the pull-down maintenance module comprises an eleventh transistor and a twelfth transistor. The eleventh transistor includes a gate connected to the second node, a source connected to the second constant low voltage terminal, and a drain connected to the nth-stage transmission terminal. The twelfth transistor includes a gate connected to the second node, a source connected to the second constant low voltage terminal, and a drain connected to the nth-stage gate-driven signal terminal.

In some embodiments of the present disclosure, each of the plurality of cascaded GOA units further comprises a second capacitor between the first node and to the nth-stage gate-driven signal terminal.

In some embodiments of the present disclosure, each of the plurality of cascaded GOA units further comprises a leakage-proof module that comprises a thirteenth transistor having a gate connected to the first node, a source connected to a constant high voltage terminal, and a drain connected to the nth-stage maintenance signal terminal.

Another embodiment of the present disclosure is directed to a display panel that comprises a gate driver on array (GOA) circuit. The GOA circuit includes a plurality of cascaded GOA units. Each of the plurality of cascaded GOA units includes a pull-up control module, a pull-up module, an inverting control module, a first pull-down module, a second pull-down module, and a pull-down maintenance module.

The pull-up control module is connected to an (n−4)th-stage transmission signal terminal and a first node. The pull-up control module is configured to raise the voltage level of the first node under the control of the (n−4)th-stage transmission signal terminal.

The pull-up module is connected to an nth-stage clock signal terminal, the first node, an nth-stage transmission signal terminal, and an nth-stage gate-driven signal terminal. The pull-up module is configured to control the output of the nth-stage transmission signal terminal and the nth-stage gate-driven signal terminal through the nth-stage clock signal terminal under the control of the first node.

The inverting control module is connected to the first node, a second node, an (n+1)th-stage clock signal terminal, a constant high voltage terminal, and a first constant low voltage terminal. The inverting control module is configured to control the voltage level of the second node to be opposite to the voltage level of the first node through the constant high voltage terminal and the first constant low voltage terminal under the control of the first node and the (n+1)th-stage clock signal terminal.

The first pull-down module is connected to an (n+4)th-stage transmission signal terminal, the first node, and the first constant low voltage terminal. The first pull-down module is configured to lower the voltage level of the first node through the first constant low voltage terminal under the control of the (n+4)th-stage transmission signal terminal.

The second pull-down module is connected to the (n+4)th-stage transmission signal terminal, a second constant low voltage terminal, the nth-stage gate-driven signal terminal, and the second constant low voltage terminal. The second pull-down module is configured to lower the voltage level of the nth-stage transmission signal terminal and the voltage level of the nth-stage gate-driven signal terminal through the second constant low voltage terminal under the control of the (n+4)th-stage transmission signal terminal.

The pull-down maintenance module is connected to the second node QB, the nth-stage transmission signal terminal, the nth-stage gate-driven signal terminal, and the second constant low voltage terminal. The pull-down maintenance module is configured to lower the voltage level of the nth-stage transmission signal terminal and the voltage level of the nth-stage gate-driven signal terminal through the second constant low voltage terminal by imposing a voltage on the second node.

In some embodiments of the present disclosure, the inverting control module comprises a first transistor, a second transistor, a third transistor, a fourth transistor, and a first capacitor. A gate of the first transistor is connected to the (n+1)th-stage clock signal terminal. A source of the first transistor and a source of the third transistor are both connected to the constant high voltage terminal. A gate of the second transistor and a gate of the fourth transistor are both connected to the first nod. A drain of the first transistor, a drain of the second transistor, and a gate of the third transistor are all connected to a first terminal of the first capacitor. A drain of the third transistor and a drain of the fourth transistor are both connected to a second terminal of the first capacitor. A source of the second transistor and a source of the fourth transistor are both connected to the first constant low voltage terminal.

In some embodiments of the present disclosure, the pull-up control module comprises a fifth transistor. A gate of the fifth transistor and a source of the fifth transistor are both connected to the (n−4)th-stage transmission terminal. A drain of the fifth transistor is connected to the first node.

In some embodiments of the present disclosure, the pull-up module comprises a sixth transistor and a seventh transistor. The sixth transistor includes a gate connected to the first node, a source connected to the nth-stage clock signal terminal, and a drain connected to the nth-stage transmission terminal. The seventh transistor includes a gate connected to the first node, a source connected to the nth-stage clock signal terminal, and a drain connected to the nth-stage gate-driven signal terminal.

In some embodiments of the present disclosure, the first pull-down module comprises an eighth transistor that includes a gate connected to the (n+4)th-stage transmission terminal, a source connected to the first constant low voltage terminal, and a drain connected to the first node.

In some embodiments of the present disclosure, the second pull-down module comprises a ninth transistor and a tenth transistor. The ninth transistor includes a gate connected to the (n+4)th-stage transmission terminal, a source connected to the second constant low voltage terminal, a drain connected to the nth-stage transmission terminal. The tenth transistor includes a gate connected to the (n+4)th-stage transmission terminal, a source connected to the second constant low voltage terminal, and a drain connected to the nth-stage gate-driven signal terminal.

In some embodiments of the present disclosure, the pull-down maintenance module comprises an eleventh transistor and a twelfth transistor. The eleventh transistor includes a gate connected to the second node, a source connected to the second constant low voltage terminal, and a drain connected to the nth-stage transmission terminal. The twelfth transistor includes a gate connected to the second node, a source connected to the second constant low voltage terminal, and a drain connected to the nth-stage gate-driven signal terminal.

In some embodiments of the present disclosure, each of the plurality of cascaded GOA units further comprises a second capacitor between the first node and to the nth-stage gate-driven signal terminal.

In some embodiments of the present disclosure, each of the plurality of cascaded GOA units further comprises a leakage-proof module that comprises a thirteenth transistor having a gate connected to the first node, a source connected to a constant high voltage terminal, and a drain connected to the nth-stage maintenance signal terminal.

Advantageous Effect

A gate driver on array (GOA) circuit and a display panel are proposed by a preferred embodiment of the present disclosure. An inverting control module controls the voltage level of the first node to be opposite to the voltage level of the second node under the control of an (n+1)th-stage clock signal. Since the first node is at a high voltage level and the second node is at a low voltage level, The (n+1)th-stage clock signal is a pulse signal and is not at the high voltage level for the long period of time. Therefore, the formation of a direct current (DC) channel between a constant high voltage terminal and a first constant low voltage terminal is avoided. When a first node is at the low voltage level, the constant high voltage terminal VGH converts a second node from at the low voltage level to at the high voltage level in the process of converting the (n+1)th-stage clock signal terminal from at the low voltage level to at the high voltage level, and the constant high voltage terminal is still at the high voltage level in the process of converting the (n+1)th-stage clock signal terminal from at the high voltage level to at the low voltage level. Accordingly, the second node is constantly at the high voltage level at the pull-down maintenance stage in the GOA circuit, and the nth-stage gate-driven signal terminal is still at the low voltage level. In this way, the GOA circuit will not become useless and ineffective due to instability.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Figure 1:
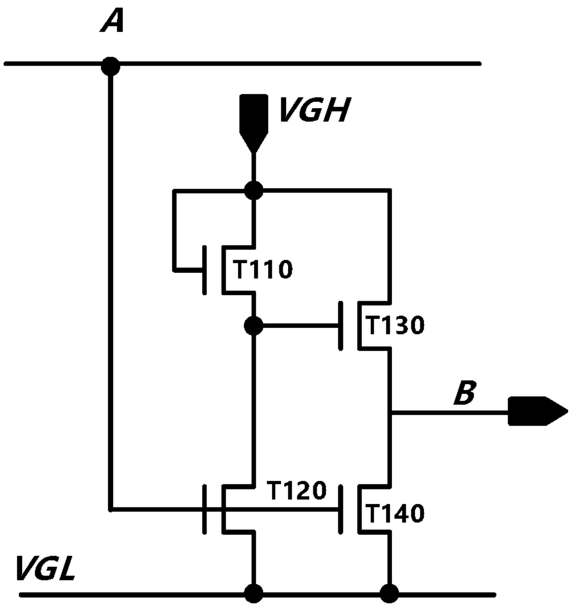
FIG. 1 illustrates a circuit diagram of an inverter used in a conventional GOA circuit.
Figure 2:
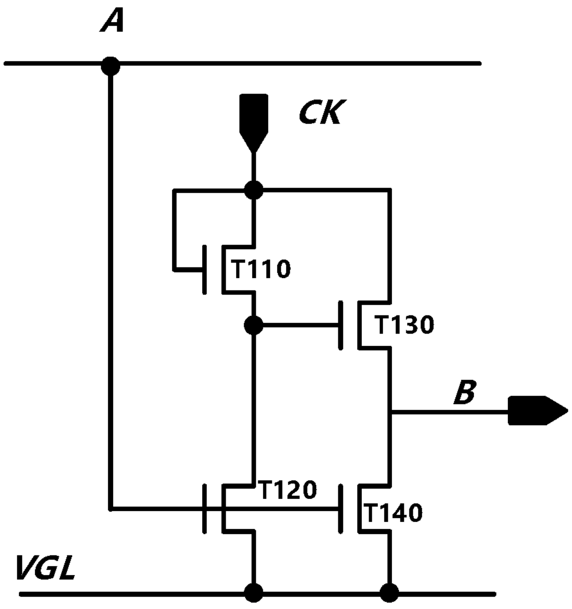
FIG. 2 illustrates a circuit diagram of another inverter used in a conventional GOA circuit.
Figure 3:
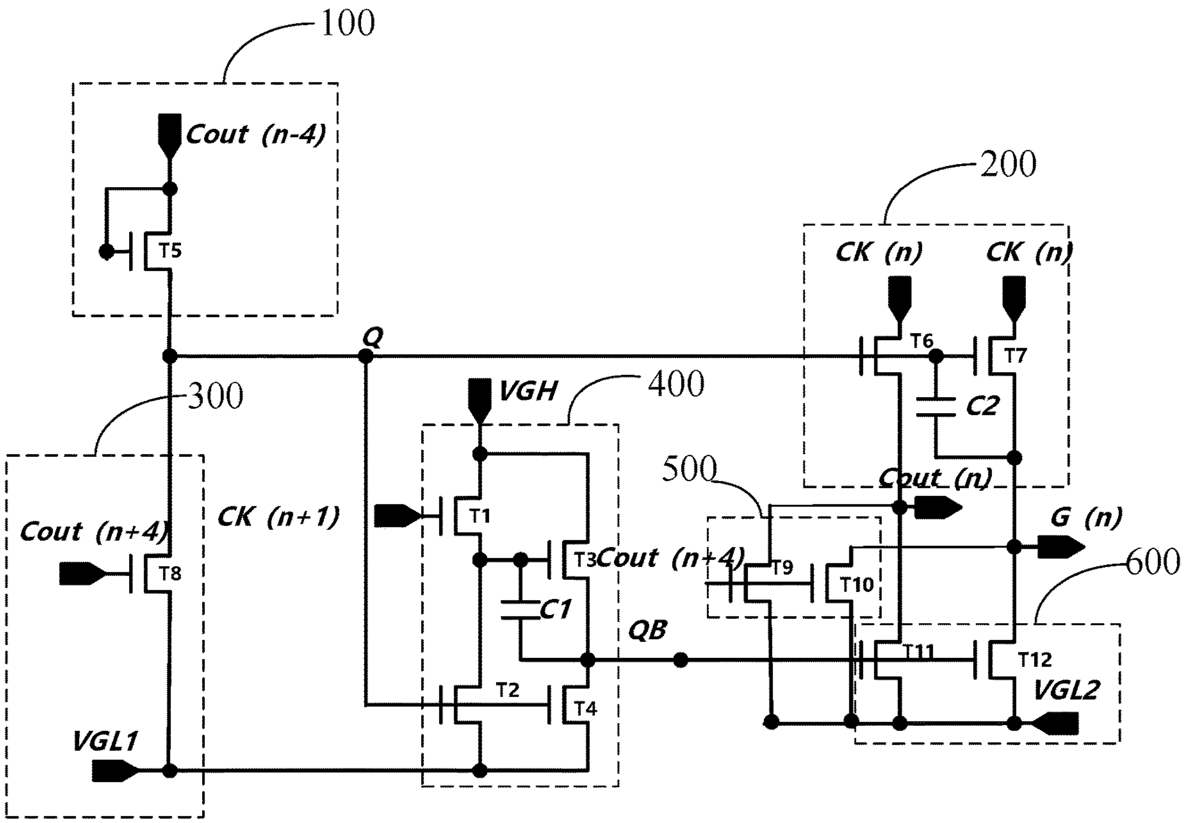
FIG. 3 illustrates a circuit diagram of a GOA circuit according to an embodiment of the present disclosure.

Please refer to FIG. 3. A gate driver on array (GOA) circuit is proposed by a preferred embodiment of the present disclosure. The GOA circuit includes a plurality of cascaded GOA units. Each of the plurality of cascaded GOA units includes a pull-up control module 100, a pull-up module 200, a first pull-down module 300, an inverting control module 400, a second pull-down module 500, and a pull-down maintenance module 600.

The pull-up control module 100 is connected to an (n−4)th-stage transmission signal terminal Cout(n−4) and a first node Q. The pull-up control module 100 is configured to raise the voltage level of the first node Q under the control of the (n−4)th-stage transmission signal terminal Cout(n−4).

The pull-up module 200 is connected to an nth-stage clock signal terminal CK(n), the first node Q, an nth-stage transmission signal terminal Cout(n), and an nth-stage gate-driven signal terminal G(n). The pull-up module 200 is configured to control the output of the nth-stage transmission signal terminal Cout(n) and the nth-stage gate-driven signal terminal G(n) through the nth-stage clock signal terminal CK(n) under the control of the first node Q.

The inverting control module 400 is connected to the first node Q, a second node QB, an (n+1)th-stage clock signal terminal CK(n+1), a constant high voltage terminal VGH, and a first constant low voltage terminal VGL1. The inverting control module 400 is configured to control the voltage level of the second node QB to be opposite to the voltage level of the first node Q through the constant high voltage terminal VGH and the first constant low voltage terminal VGL1 under the control of the first node Q and the (n+1)th-stage clock signal terminal CK(n+1).

The first pull-down module 300 is connected to an (n+4)th-stage transmission signal terminal Cout(n+4), the first node Q, and the first constant low voltage terminal VGL1. The first pull-down module 300 is configured to lower the voltage level of the first node Q through the first constant low voltage terminal VGL1 under the control of the (n+4)th-stage transmission signal terminal Cout(n+4).

The second pull-down module 500 is connected to an (n+4)th-stage transmission signal terminal Cout(n+4), a second constant low voltage terminal VGL2, the nth-stage gate-driven signal terminal G(n), and the second constant low voltage terminal VGL2. The second pull-down module 500 is configured to lower the voltage level of the nth-stage transmission signal terminal Cout(n) and the voltage level of the nth-stage gate-driven signal terminal G(n) through the second constant low voltage terminal VGL2 under the control of the (n+4)th-stage transmission signal terminal Cout(n+4).

The pull-down maintenance module 600 is connected to the second node QB, the nth-stage transmission signal terminal Cout(n), the nth-stage gate-driven signal terminal G(n), and the second constant low voltage terminal VGL2. The pull-down maintenance module 600 is configured to lower the voltage level of the nth-stage transmission signal terminal Cout(n) and the voltage level of the nth-stage gate-driven signal terminal G(n) through the second constant low voltage terminal VGL2 under the control of the second node QB.

The inverting control module 400 of the nth-stage GOA unit is configured to control the voltage level of the second node QB to be opposite to the voltage level of the first node Q through the constant high voltage terminal VGH and the first constant low voltage terminal VGL1 under the control of the first node Q and the (n+1)th-stage clock signal terminal CK(n+1). When the first node Q is at the high voltage level and the second node QB is at the low voltage level, the (n+1)th-stage clock signal terminal CK(n+1) is not always at the high voltage level because of a pulse signal. Therefore, the formation of a direct current (DC) channel between the constant high voltage terminal VGH and the first constant low voltage terminal VGL1 is avoided. When the first node Q is at the low voltage level, the constant high voltage terminal VGH converts the second node QB from at the low voltage level to at the high voltage level in the process of converting the (n+1)th-stage clock signal terminal CK(n+1) from at the low voltage level to at the high voltage level, and the constant high voltage terminal VGH is still at the high voltage level in the process of converting the (n+1)th-stage clock signal terminal CK(n+1) from at the high voltage level to at the low voltage level. Accordingly, the second node QB is constantly at the high voltage level at the pull-down maintenance stage in the GOA circuit, and the nth-stage gate-driven signal terminal G(n) is still at the low voltage level. In this way, the GOA circuit will not become useless and ineffective due to instability.

The inverting control module 400 includes a first transistor T1, a second transistor T2, a third transistor T3, a fourth transistor T4, and a first capacitor C1. A gate of the first transistor T1 is connected to the (n+1)th-stage clock signal terminal CK(n+1). A source of the first transistor T1 and a source of the third transistor T3 are both connected to the constant high voltage terminal VGH. A gate of the second transistor T2 and a gate of the fourth transistor T4 are both connected to the first node Q. A drain of the first transistor T1, a drain of the second transistor T2, and a gate of the third transistor T3 are all connected to a first terminal of the first capacitor C1. A drain of the third transistor T3 and a drain of the fourth transistor T4 are both connected to a second terminal of the first capacitor C1. A source of the second transistor T2 and a source of the fourth transistor T4 are both connected to the first constant low voltage terminal VGL1.

The inverting control module 400 is formed by the first transistor T1, the second transistor T2, the third transistor T3, the fourth transistor T4, and the first capacitor C1. The first transistor T1 is controlled by the (n+1)th-stage clock signal terminal CK(n+1) to be turned on or off. When the GOA unit is at the pre-charging and pull-up stage, the first node Q is at the high voltage level to control the second transistor T2 and the fourth transistor T4 to be turned up. The first constant low voltage terminal VGL1 makes the second node QB be at the low voltage level. Because the (n+1)th-stage clock signal terminal CK(n+1) is a pulse signal at this time, the (n+1)th-stage clock signal terminal CK(n+1) is still at the low voltage level. In other words, the (n+1)th-stage clock signal terminal CK(n+1) is not always at the high voltage level. Therefore, the first transistor T1 and the third transistor T3 are closed for a long time to prevent the formation of the DC channel between the constant high voltage terminal VGH and the first constant low voltage terminal VGL1. When the GOA unit is in a pull-down maintenance phase after the pull-down phase, the first node Q is at the low voltage level to make the second transistor T2 and the fourth transistor T4 be turned off. The first transistor T1 and the third transistor T3 are turned on while the (n+1)th-stage clock signal terminal CK(n+1) at the low voltage level is converted into the (n+1)th-stage clock signal terminal CK(n+1) at the high voltage level. The constant high voltage terminal VGH makes the second node QB at the low voltage level be raised to be at the high voltage level while the first capacitor C1 is charged. Besides, in the process of converting the (n+1)th-stage clock signal terminal CK(n+1) at the high voltage level into the (n+1)th-stage clock signal terminal CK(n+1) at the low voltage level and in the process of turning on the first transistor to turning off the first transistor, the constant high voltage terminal VGH makes the third transistor T3 be still turned on for a period of time. Afterwards, the gate of the third transistor T3 is still at the high voltage level for a certain period of time to make the second node QB be still at the high voltage level. The second node QB is still at the high voltage level when the first capacitor C1 is coupled. So the second node QB is constantly at the high level in the pull-down maintenance phase to keep the voltage level of the nth-stage gate-driven signal terminal G(n). In this way, the GOA circuit will not become useless and ineffective due to instability.

The pull-up control module 100 includes a fifth transistor T5. A gate of the fifth transistor T5 and a source of the fifth transistor T5 are both connected to the (n−4)th-stage transmission terminal Cout(n−4). A drain of the fifth transistor T5 is connected to the first node Q.

The pull-up module 200 includes a sixth transistor T6 and a seventh transistor T7. A gate of the sixth transistor T6 and a gate of the seventh transistor T7 are both connected to the first node Q. A source of the sixth transistor T6 and a source of the seventh transistor T7 are both connected to the nth-stage clock signal terminal CK(n). A drain of the sixth transistor T6 is connected to the nth-stage transmission terminal. A drain of the seventh transistor T7 is connected to the nth-stage gate-driven signal terminal G(n).

The first pull-down module 300 includes an eighth transistor T8. A gate of the eighth transistor T8 is connected to the (n+4)th-stage transmission terminal Cout(n+4). A source of the eighth transistor T8 is connected to the first constant low voltage terminal VGL1. A drain of the eighth transistor T8 is connected to the first node Q.

The second pull-down module 500 includes a ninth transistor T9 and a tenth transistor T10. A gate of the ninth transistor T9 and a gate of the tenth transistor T10 are both connected to the (n+4)th-stage transmission terminal Cout (n+4). A source of the ninth transistor T9 and a source of the tenth transistor T10 are both connected to the second constant low voltage terminal VGL2. A drain of the ninth transistor T9 is connected to the nth-stage transmission terminal. A drain of the tenth transistor T10 is connected to the nth-stage gate-driven signal terminal G(n).

The pull-down maintenance module 600 includes an eleventh transistor T11 and a twelfth transistor T12. A gate of the eleventh transistor T11 and a gate of the twelfth transistor T12 are both connected to the second node QB. A source of the eleventh transistor T11 and a source of the twelfth transistor T12 are both connected to the second constant low voltage terminal VGL2. A drain of the eleventh transistor T11 is connected to the nth-stage transmission terminal. A drain of the twelfth transistor T12 is connected to the nth-stage gate-driven signal terminal G(n).

Further, each of the plurality of cascaded GOA units includes a second capacitor C2. A first terminal of the second capacitor C2 is connected to the first node Q. A second terminal of the second capacitor C2 is connected to the nth-stage gate-driven signal terminal G(n).

Figure 5:
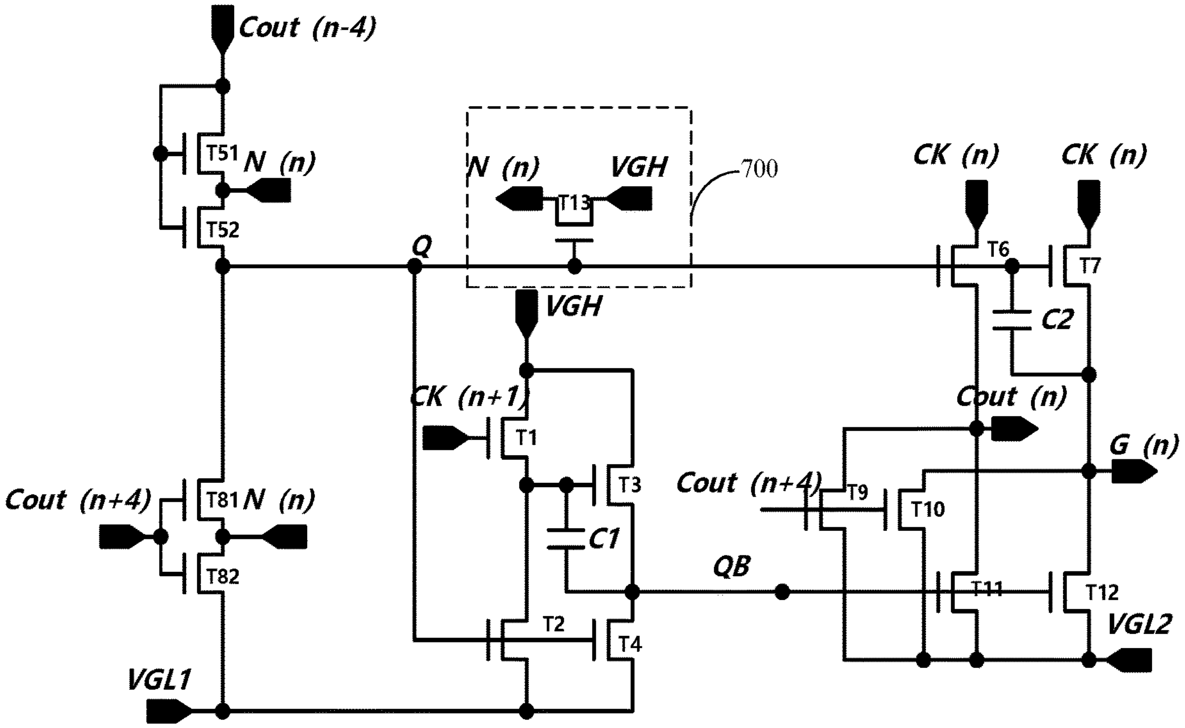
FIG. 5 illustrates a circuit diagram of a GOA circuit according to another embodiment of the present disclosure.

Please refer to FIG. 5. In a preferred embodiment of the present disclosure, a pull-up control module 100 includes a 51st transistor T51 and a 52nd transistor T52 to ensure the stability of a first node Q at a high voltage level. A gate of the 51st transistor T51, a source of the 51st transistor T51, and a gate of the 52nd transistor T52 are all connected to an (n−4)th-stage transmission terminal Cout(n−4). A drain of the 51st transistor T51 and a source of the 52nd transistor T52 are both connected to a first node Q. A first pull-down module 300 includes an 81st transistor T81 and an 82nd transistor T82. A gate of the 81st transistor T81, a source of the 81st transistor T81, and a gate of the 82nd transistor T82 are all connected to an (n+4)th-stage transmission terminal Cout(n+4). The source of the 81st transistor T81 and a drain of the 82nd transistor T82 are both connected to an nth-stage maintenance signal terminal N(n). A drain of the 82nd transistor T82 is connected to a first constant low voltage terminal VGL1. At the same time, each of a plurality of cascaded GOA units further includes a leakage-proof module 700. The leakage-proof module 700 includes a thirteenth transistor T13. A gate of the thirteenth transistor T13 is connected to the first node Q. A source of the thirteenth transistor T13 is connected to a constant high voltage terminal VGH, and a drain of the thirteenth transistor T13 is connected to the nth-stage maintenance signal terminal N(n).

When the first node Q is at the first high voltage level, the thirteenth transistor T13 is turned on. The constant high voltage terminal VGH makes the nth-stage maintenance signal terminal N(n) be at the high voltage level and causes a source of the 51st transistor T51 and a source of the 81st transistor T81 to be both at the high voltage level. When the difference between the voltage level of a gate of an N-type thin film transistor (TFT) and the voltage level of a source of an N-type TFT is smaller than a threshold voltage, the n-type TFT is turned off. At this time, both of the 51st transistor T51 and the 81st transistor T81 are turned off more thoroughly. Thereby, the leakage current of the 51st transistor T51 and the leakage current of the 81st transistor T81 are reduced and further, a leakage path for the first node Q becomes fewer and the first node Q is at the high level constantly and stably.

Figure 4:
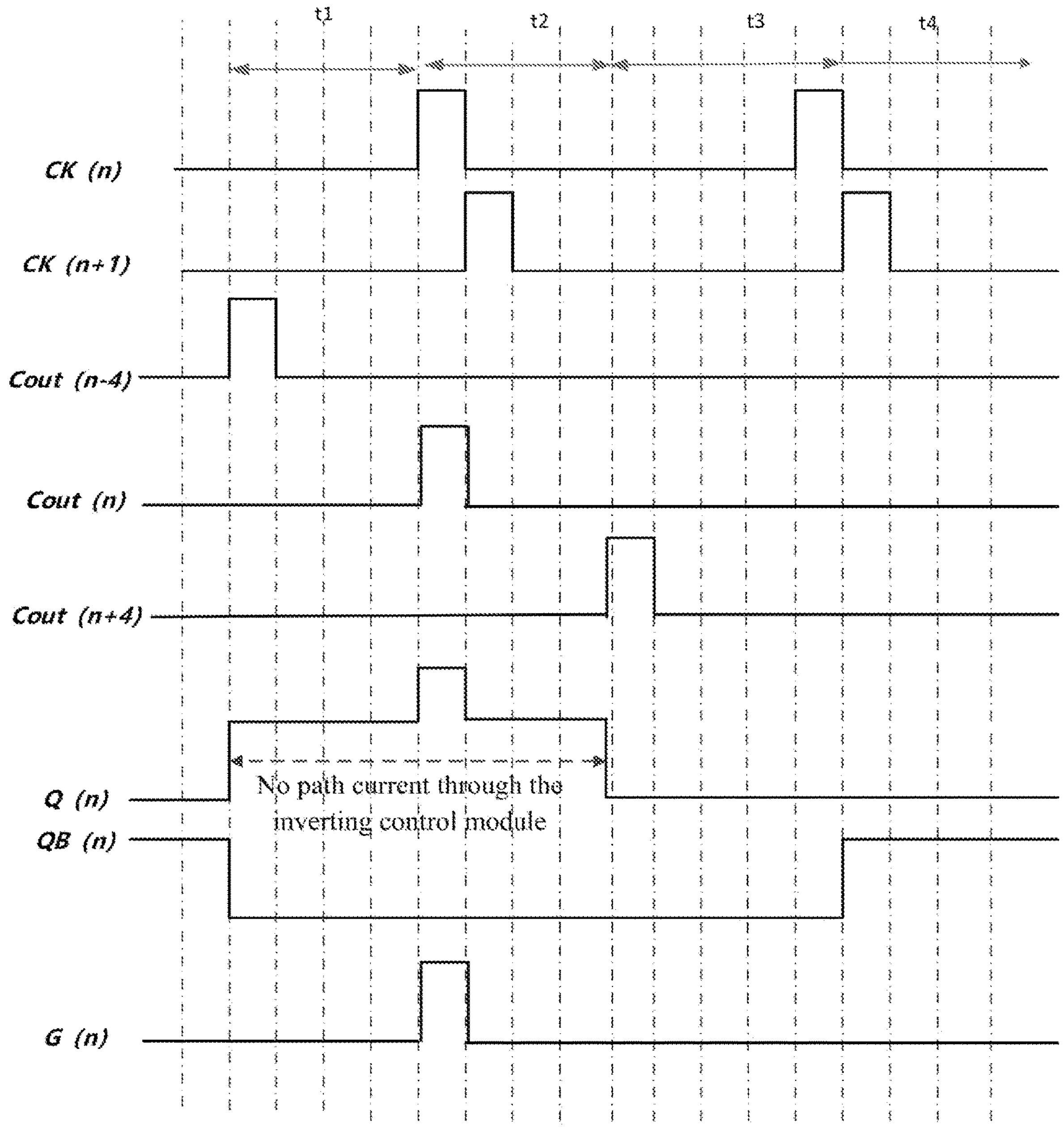
FIG. 4 illustrates a timing diagram of a GOA circuit according to an embodiment of the present disclosure.

With reference to FIG. 3 and FIG. 4, the working process of the GOA circuit includes a pre-charging phase t1, a pull-up phase t2, a pull-down phase t3, and a pull-down maintenance phase t4.

In the pre-charging phase t1, the (n−4)th-stage transmission terminal Cout(n−4) is at the high voltage level and the fifth transistor T5 is turned off so that the first node Q is raised to be at the first high voltage level and both of the second transistor T2 and the fourth transistor T4 are turned up. Besides, the first constant low voltage terminal VGL1 controls the voltage level of the second node QB to be low.

In the pull-up phase t2, the nth-stage clock signal terminal CK(n) is at the high voltage level to make the nth-stage transmission terminal be at the high voltage level. Because the second capacitor C2 performs the function of bootstrap, the voltage level of the first node Q is raised to a second high voltage level the second time and the second high voltage level is greater than the first high voltage level. When the nth-stage clock signal terminal CK(n) is at the low voltage level, the voltage level of the first node Q is lowered to the first high voltage level and both of the nth-stage transmission terminal and the nth-stage gate-driven signal terminal G(n) are lowered to the low voltage level.

In the pull-down phase t3, the (n+4)th-stage transmission terminal Cout(n+4) is at the high voltage level so that all of the eighth transistor T8, the ninth transistor T9, and the tenth transistor T10 are turned up. The first constant low voltage terminal VGL1 lowers the voltage level of the first node Q to make the second transistor T2 and the fourth transistor T4 be turned off. Additionally, the second constant low voltage terminal VGL2 lowers the voltage level of the nth-stage transmission terminal and the nth-stage gate-driven signal terminal G(n).

In the pull-down maintenance phase t4, the (n+1)th-stage clock signal terminal CK(n+1) is at the high voltage level to make the first transistor T1 to be turned on. The constant high voltage terminal VGH makes the third transistor T3 be turned on. Meanwhile, the first capacitor C1 is charged to make the second node QB at the high voltage level to control the ninth transistor T9 and the tenth transistor T10 to be turned on. The second constant low voltage terminal VGL2 lowers the voltage level of the nth-stage transmission terminal and the voltage level of the nth-stage gate-driven signal terminal G(n) to be low. In the process of switching the voltage level of the (n+1)th-stage clock signal terminal CK(n+1) from high to low and turning the first transistor T1 on to turning the first transistor T1 off, the constant high voltage terminal VGH makes the third transistor T3 still be turned on for a period of time. Subsequently, the gate of the third transistor T3 still remains at the high voltage level for a period of time so that the second node QB is still at the high voltage level. Meanwhile, the coupling of the first capacitor C1 makes the second node QB at the high voltage level constantly. Thus, the second node QB is still at the high voltage level in the pull-down maintenance phase to further keep the voltage level of the nth-stage gate-driven signal terminal G(n). In this way, the GOA circuit will not become useless and ineffective due to instability.

Based on the preferred embodiment of the present disclosure, a preferred embodiment of the present disclosure further proposes a display panel. The display panel includes a gate driver on array (GOA) circuit as introduced above. The structure of the display panel is the same as the structure of the GOA circuit, and the beneficial effect provided by the display panel is the same as the beneficial effect provided by the GOA circuit. Owing to the detailed introduction of the GOA circuit in each of the preferred embodiment of the present disclosure, the GOA circuit in the present embodiment will not be detailed.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A gate driver on array (GOA) circuit, comprising a plurality of cascaded GOA units; each of the plurality of cascaded GOA units comprising:

a pull-up control module, connected to an (n−4)th-stage transmission signal terminal and a first node and configured to raise the voltage level of the first node under the control of the (n−4)th-stage transmission signal terminal;

a pull-up module, connected to an nth-stage clock signal terminal, the first node, an nth-stage transmission signal terminal, and an nth-stage gate-driven signal terminal, configured to control the output of the nth-stage transmission signal terminal and the nth-stage gate-driven signal terminal through the nth-stage clock signal terminal under the control of the first node;

an inverting control module, connected to the first node, a second node, an (n+1)th-stage clock signal terminal, a constant high voltage terminal, and a first constant low voltage terminal, and configured to control the voltage level of the second node to be opposite to the voltage level of the first node through the constant high voltage terminal and the first constant low voltage terminal under the control of the first node and the (n+1)th-stage clock signal terminal;

a first pull-down module, connected to an (n+4)th-stage transmission signal terminal, the first node, and the first constant low voltage terminal, configured to lower the voltage level of the first node through the first constant low voltage terminal under the control of the (n+4)th-stage transmission signal terminal;

a second pull-down module, connected to the (n+4)th-stage transmission signal terminal, a second constant low voltage terminal, the nth-stage gate-driven signal terminal, and the second constant low voltage terminal, and configured to lower the voltage level of the nth-stage transmission signal terminal and the voltage level of the nth-stage gate-driven signal terminal through the second constant low voltage terminal under the control of the (n+4)th-stage transmission signal terminal; and a pull-down maintenance module, connected to the second node, the nth-stage transmission signal terminal, the nth-stage gate-driven signal terminal, and the second constant low voltage terminal, and configured to lower the voltage level of the nth-stage transmission signal terminal and the voltage level of the nth-stage gate-driven signal terminal through the second constant low voltage terminal by imposing a voltage on the second node.

2. The GOA circuit of claim 1, wherein the inverting control module comprises a first transistor, a second transistor, a third transistor, a fourth transistor, and a first capacitor; a gate of the first transistor is connected to the (n+1)th-stage clock signal terminal; a source of the first transistor and a source of the third transistor are both connected to the constant high voltage terminal; a gate of the second transistor and a gate of the fourth transistor are both connected to the first nod; a drain of the first transistor, a drain of the second transistor, and a gate of the third transistor are all connected to a first terminal of the first capacitor; a drain of the third transistor and a drain of the fourth transistor are both connected to a second terminal of the first capacitor; a source of the second transistor and a source of the fourth transistor are both connected to the first constant low voltage terminal.

3. The GOA circuit of claim 1, wherein the pull-up control module comprises a fifth transistor; a gate of the fifth transistor and a source of the fifth transistor are both connected to the (n−4)th-stage transmission terminal; a drain of the fifth transistor is connected to the first node.

4. The GOA circuit of claim 1, wherein the pull-up module comprises:

a sixth transistor, having a gate connected to the first node, a source connected to the nth-stage clock signal terminal, and a drain connected to the nth-stage transmission terminal; and a seventh transistor, having a gate connected to the first node, a source connected to the nth-stage clock signal terminal, and a drain connected to the nth-stage gate-driven signal terminal.

5. The GOA circuit of claim 1, wherein the first pull-down module comprises an eighth transistor, having a gate connected to the (n+4)th-stage transmission terminal, a source connected to the first constant low voltage terminal, and a drain connected to the first node.

6. The GOA circuit of claim 1, wherein the second pull-down module comprises:

a ninth transistor, having a gate connected to the (n+4)th-stage transmission terminal, a source connected to the second constant low voltage terminal, a drain connected to the nth-stage transmission terminal; and a tenth transistor, having a gate connected to the (n+4)th-stage transmission terminal, a source connected to the second constant low voltage terminal, and a drain connected to the nth-stage gate-driven signal terminal.

7. The GOA circuit of claim 3, wherein the pull-down maintenance module comprises:

an eleventh transistor, having a gate connected to the second node, a source connected to the second constant low voltage terminal, and a drain connected to the nth-stage transmission terminal; and a twelfth transistor, having a gate connected to the second node, a source connected to the second constant low voltage terminal, and a drain connected to the nth-stage gate-driven signal terminal.

8. The GOA circuit of claim 2, wherein each of the plurality of cascaded GOA units further comprises a second capacitor between the first node and to the nth-stage gate-driven signal terminal.

9. The GOA circuit of claim 2, wherein each of the plurality of cascaded GOA units further comprises a leakage-proof module that comprises a thirteenth transistor having a gate connected to the first node, a source connected to a constant high voltage terminal, and a drain connected to the nth-stage maintenance signal terminal.

10. A display panel comprising a gate driver on array (GOA) circuit that comprises a plurality of cascaded GOA units, each of the plurality of cascaded GOA units comprising:

a pull-up control module, connected to an (n−4)th-stage transmission signal terminal and a first node, and configured to raise the voltage level of the first node under the control of the (n−4)th-stage transmission signal terminal;

a pull-up module, connected to an nth-stage clock signal terminal, the first node, an nth-stage transmission signal terminal, and an nth-stage gate-driven signal terminal, configured to control the output of the nth-stage transmission signal terminal and the nth-stage gate-driven signal terminal through the nth-stage clock signal terminal under the control of the first node;

an inverting control module, connected to the first node, a second node, an (n+1)th-stage clock signal terminal, a constant high voltage terminal, and a first constant low voltage terminal, and configured to control the voltage level of the second node to be opposite to the voltage level of the first node through the constant high voltage terminal and the first constant low voltage terminal under the control of the first node and the (n+1)th-stage clock signal terminal;

a first pull-down module, connected to an (n+4)th-stage transmission signal terminal, the first node, and the first constant low voltage terminal, configured to lower the voltage level of the first node through the first constant low voltage terminal under the control of the (n+4)th-stage transmission signal terminal;

a second pull-down module, connected to the (n+4)th-stage transmission signal terminal, a second constant low voltage terminal, the nth-stage gate-driven signal terminal, and the second constant low voltage terminal, and configured to lower the voltage level of the nth-stage transmission signal terminal and the voltage level of the nth-stage gate-driven signal terminal through the second constant low voltage terminal under the control of the (n+4)th-stage transmission signal terminal; and a pull-down maintenance module, connected to the second node, the nth-stage transmission signal terminal, the nth-stage gate-driven signal terminal, and the second constant low voltage terminal, and configured to lower the voltage level of the nth-stage transmission signal terminal and the voltage level of the nth-stage gate-driven signal terminal through the second constant low voltage terminal by imposing a voltage on the second node.

11. The display panel of claim 10, wherein the inverting control module comprises a first transistor, a second transistor, a third transistor, a fourth transistor, and a first capacitor; a gate of the first transistor is connected to the (n+1)th-stage clock signal terminal; a source of the first transistor and a source of the third transistor are both connected to the constant high voltage terminal; a gate of the second transistor and a gate of the fourth transistor are both connected to the first nod; a drain of the first transistor, a drain of the second transistor, and a gate of the third transistor are all connected to a first terminal of the first capacitor; a drain of the third transistor and a drain of the fourth transistor are both connected to a second terminal of the first capacitor; a source of the second transistor and a source of the fourth transistor are both connected to the first constant low voltage terminal.

12. The display panel of claim 10, wherein the pull-up control module comprises a fifth transistor; a gate of the fifth transistor and a source of the fifth transistor are both connected to the (n−4)th-stage transmission terminal; a drain of the fifth transistor is connected to the first node.

13. The display panel of claim 10, wherein the pull-up module comprises:

a sixth transistor, having a gate connected to the first node, a source connected to the nth-stage clock signal terminal, and a drain connected to the nth-stage transmission terminal; and a seventh transistor, having a gate connected to the first node, a source connected to the nth-stage clock signal terminal, and a drain connected to the nth-stage gate-driven signal terminal.

14. The display panel of claim 10, wherein the first pull-down module comprises an eighth transistor, having a gate connected to the (n+4)th-stage transmission terminal, a source connected to the first constant low voltage terminal, and a drain connected to the first node.

15. The display panel of claim 10, wherein the second pull-down module comprises:

a ninth transistor, having a gate connected to the (n+4)th-stage transmission terminal, a source connected to the second constant low voltage terminal, a drain connected to the nth-stage transmission terminal; and a tenth transistor, having a gate connected to the (n+4)th-stage transmission terminal, a source connected to the second constant low voltage terminal, and a drain connected to the nth-stage gate-driven signal terminal.

16. The display panel of claim 12, wherein the pull-down maintenance module comprises:

an eleventh transistor, having a gate connected to the second node, a source connected to the second constant low voltage terminal, and a drain connected to the nth-stage transmission terminal; and a twelfth transistor, having a gate connected to the second node, a source connected to the second constant low voltage terminal, and a drain connected to the nth-stage gate-driven signal terminal.

17. The display panel of claim 11, wherein each of the plurality of cascaded GOA units further comprises a second capacitor between the first node and to the nth-stage gate-driven signal terminal.

18. The display panel of claim 11, wherein each of the plurality of cascaded GOA units further comprises a leakage-proof module that comprises a thirteenth transistor having a gate connected to the first node, a source connected to a constant high voltage terminal, and a drain connected to the nth-stage maintenance signal terminal.

* * * * *